US006796216B2

(12) United States Patent
Kuchheuser

(10) Patent No.: US 6,796,216 B2
(45) Date of Patent: Sep. 28, 2004

(54) GUIDE FOR THE PISTON ROD OF A PISTON-CYLINDER ASSEMBLY

(75) Inventor: Werner Kuchheuser, Windeck (DE)

(73) Assignee: Mannesmann Sachs AG, Eitorf (DE)

( * ) Notice: Subject to any disclaimer, the term of this patent is extended or adjusted under 35 U.S.C. 154(b) by 0 days.

(21) Appl. No.: 09/942,442

(22) Filed: Aug. 30, 2001

(65) Prior Publication Data

US 2002/0078823 A1 Jun. 27, 2002

(30) Foreign Application Priority Data

Sep. 1, 2000 (DE) .......................................... 100 43 051

(51) Int. Cl.$^7$ ................................................. F16I 15/18
(52) U.S. Cl. ..................................... 92/168; 277/589
(58) Field of Search ............................ 92/168; 277/589

(56) References Cited

U.S. PATENT DOCUMENTS 4,735,402 A * 4/1988 Davis .......................... 92/168
5,127,497 A * 7/1992 Struckmeyer et al. ........ 92/168
5,181,581 A * 1/1993 Engler .......................... 92/168
5,263,404 A * 11/1993 Gaucher et al. .............. 92/168
5,921,166 A * 7/1999 Machida et al. ............. 277/589

FOREIGN PATENT DOCUMENTS

DE 198 13 240 8/1999

* cited by examiner

Primary Examiner—F. Daniel Lopez
(74) Attorney, Agent, or Firm—Cohen, Pontani, Lieberman & Pavane

(57) ABSTRACT

Guide for the piston rod of a piston-cylinder assembly, especially for a vibration damper, a shock-absorbing strut, or a level-control device. The guide has a guide body with an outer end surface holding a piston rod seal, where the piston rod is installed in the guide and sealed with freedom to move in the axial direction. The piston rod seal has an axial extension opposite the piston-cylinder assembly, which extension is held in an annular recess in the end surface, which recess is spaced from the piston rod and coaxial to the piston rod.

9 Claims, 1 Drawing Sheet

GUIDE FOR THE PISTON ROD OF A PISTON-CYLINDER ASSEMBLY

BACKGROUND OF THE INVENTION

1. Field of the Invention

The invention pertains to a guide for the piston rod of a piston-cylinder assembly, especially for a vibration damper, a shock-absorbing strut, or a level-control device, where the guide has a guide body with an outer end surface, where the body holds a piston rod seal, and where the piston rod is installed in the guide and sealed with freedom of axial movement.

2. Description of the Related Art

DE 198 13 240 discloses a guide for a piston rod in which the guide serves to guide a piston rod moving in a cylinder, the guide holding a seal for the piston rod. A guide sleeve, a stripper, and a stripping lip are also parts of the structural unit. The piston rod seal is provided on its outer surface with an O-ring, which serves as a clamping ring; two of these sealing units can be arranged in a row in the axial direction. The disadvantage here is that the entire axial length of the O-ring presses against the piston rod seal, so that, at the planned operating pressures of, for example, 50–150 bars in a level-control element, a seal of this type suffers increased wear and thus does not offer the desired long-term durability. In addition, high coefficients of friction, which are not acceptable in practice, are observed at these high operating pressures.

SUMMARY OF THE INVENTION

Against this background, it is the object of the invention to create a guide for a piston rod with a piston rod seal, in which the seal operates not only with low friction but also without any leakage of oil.

This object is achieved in that the piston rod seal has an axial extension which passes around at least part of the circumference and which is located on the end opposite the interior space of the piston-cylinder assembly. This extension is held in a recess which is spaced from the piston rod and coaxial to it. The piston rod seal is thus supported on the end facing away from the pressure in the recess provided in the guide body so that this part of the piston rod seal is not pressed against the surface of the piston rod as a result of the static and dynamic pretension of the O-ring. It is advantageous for the essential and necessary pressure to be limited to the area of the sealing edge.

In accordance with another feature, the piston rod seal is provided with an O-ring on the radially outer circumferential surface, i.e., on the side opposite the sealing edge.

In an embodiment which is favorable in terms of production technology, the extended area passes all the away around the circumference. It is thus sufficient merely to introduce an annular channel into the guide body by means of a turning operation. The seal then engages in this channel and is supported radially with respect to the piston rod by the inside wall of the channel.

In accordance with an essential feature of the invention, an angled relief is provided between the piston rod and the piston rod seal, which relief starts from the sealing edge and extends in the direction of the axial extension as an inward facing frusto-conical surface. In this design it is advantageous that, as a result of the way in which the piston rod seal is supported, the relief remains almost completely preserved even at high internal operating pressures of the piston-cylinder assembly, and thus the return of leakage oil is ensured, regardless of the pressure.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
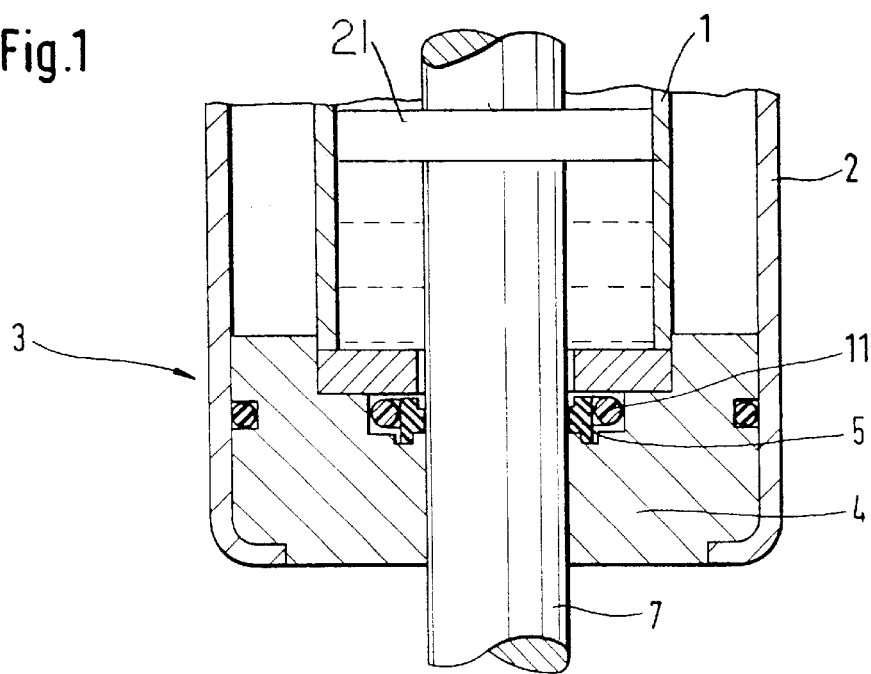
FIG. 1 is a cross-section of a piston rod guide according to the invention.

FIG. 1 shows essentially a piston-cylinder assembly 3 for motor vehicles, in which the piston rod 7 moves inside a working cylinder 1 and guides a damping piston 21 shown schematically). The working cylinder 1 is surrounded by an outside tube 2; the guide body 4 for the piston rod is located between the working cylinder 1 and the outside tube 2. The guide body 4 has a central bore which serves to center the piston rod 7; a piston rod seal 5 and an O-ring 11 are located between the guide body 4 and the piston rod 7.

Figure 2:
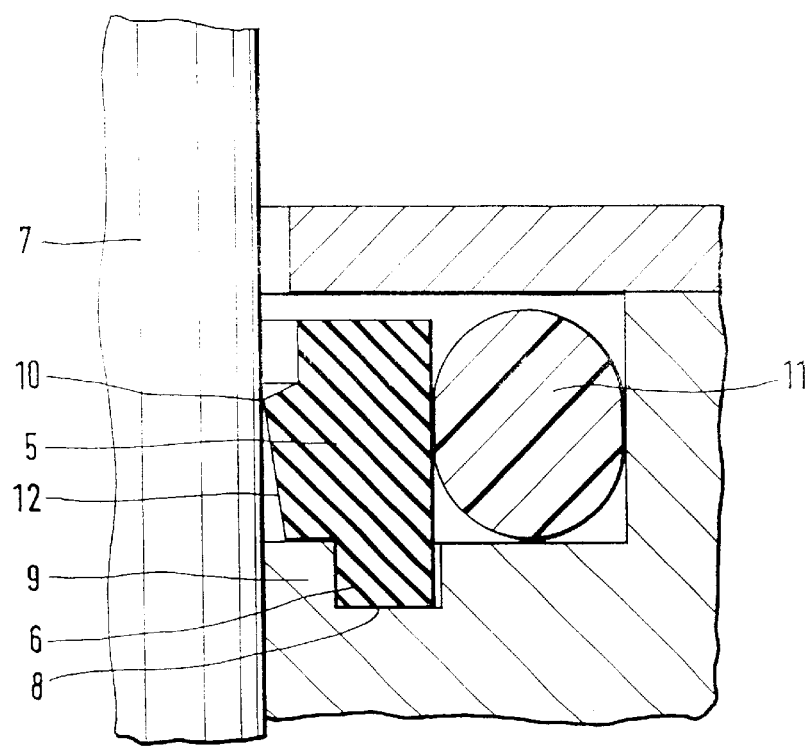
FIG. 2 is a cross-section showing the rod seal in detail.

FIG. 2 shows an enlarged view of a detail of the piston rod seal 5. The O-ring 11 is located radially opposite the sealing edge 10, and an axial extension 6 in the annular recess 8 is supported radially with respect to the piston rod 7 by the shoulder 9, 50 that there can be no contact between the piston rod seal 5 and the piston rod 7 in the area of the angled relief surface 12, preferably a frustoconical surface, which extends from the sealing edge 10 radially outward and toward the axial extension 6. It is thus possible for leakage oil to return in the direction of the working cylinder 1.

The O-ring 11 used as a clamping ring exerts its pretensioning force primarily in the area of the sealing edge 10. This leads to a low-friction, wear-resistant piston rod seal 5 and thus to an assembly with a prolonged service life. The O-ring 11 is received against the radially outermost peripheral surface of the seal 5, substantially radially outside of the recess 8.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A guide for a piston rod of a piston-cylinder assembly, said guide comprising a guide body having an axial central bore for receiving a piston rod, an axially facing end surface, a shoulder, and a recess in the end surface, said recess being coaxial to said bore and spaced from said bore by said shoulder, a piston rod seal having a sealing edge for said piston rod, a radially outermost peripheral surface, an axial extension which is received in said recess and supported radially by said shoulder, and an angled relief surface which extends from said sealing edge radially outward and toward said axial extension, and an O-ring which is received against said radially outermost peripheral surface substantially radially outside of the recess.

2. A guide as in claim 1 wherein said shoulder is an annular shoulder which is immediately adjacent to said bore, said angled relief surface extending axially toward said shoulder and radially toward said recess.

3. A guide as in claim 1 wherein said recess is an annular recess, and said axial extension is an annular extension.

4. A guide for a piston rod as in claim 1, wherein said angled relief surface is a frustoconical surface.

5. A piston-cylinder assembly comprising a working cylinder, a piston rod which moves axially in said working cylinder and guides a piston in the working cylinder, a guide body having an axial central bore which receives the piston rod, an end surface facing the working cylinder, a shoulder, and a recess in the end surface, said recess being coaxial to said bore and spaced from said bore by said shoulder, a piston rod seal having a sealing edge in contact with said piston rod, a radially outermost peripheral surface, an axial extension which extends away from the working cylinder and which is received in said recess and supported radially by said shoulder, and an angled relief surface which extends from said sealing edge radially outward and toward said axial extension, and an O-ring which is received against said radially outermost peripheral surface.

6. A piston-cylinder assembly as in claim 5, wherein said angled relief surface is a frustoconical surface.

7. A piston-cylinder assembly as in claim 5, wherein the O-ring is located substantially radially outside of the recess which receives the axial extension of the piston rod seal.

8. A piston-cylinder assembly as in claim 5 wherein said recess is an annular recess, and said axial extension is an annular extension.

9. A piston cylinder assembly as in claim 5 wherein said shoulder is an annular shoulder which is immediately adjacent to said bore, said angled relief surface extending axially toward said shoulder and radially toward said recess.

* * * * *